United States Patent
Lucero et al.

(10) Patent No.: US 9,298,362 B2
(45) Date of Patent: Mar. 29, 2016

(54) METHOD AND APPARATUS FOR SHARING MEDIA IN A MULTI-DEVICE ENVIRONMENT

(75) Inventors: Andrés Lucero, Tampere (FI); Tero Jokela, Tampere (FI); Jussi Pekka Holopainen, Tampere (FI); Juha Henrik Arrasvuori, Tampere (FI); Jaakko Olli Taavetti Keränen, Tampere (FI); Hannu J. Korhonen, Kangasala (FI); Marion Boberg, Suinula (FI); Erika Piia Pauliina Reponen, Tampere (FI)

(73) Assignee: Nokia Technologies Oy, Espoo (FI)

( * ) Notice: Subject to any disclaimer, the term of this patent is extended or adjusted under 35 U.S.C. 154(b) by 770 days.

(21) Appl. No.: 13/025,916

(22) Filed: Feb. 11, 2011

(65) Prior Publication Data

US 2012/0206319 A1    Aug. 16, 2012

(51) Int. Cl.
G09G 5/00       (2006.01)
G06F 3/0488     (2013.01)
H04N 21/4788    (2011.01)
H04W 4/06       (2009.01)
H04N 21/41      (2011.01)
H04N 21/414     (2011.01)
H04N 21/422     (2011.01)
(Continued)

(52) U.S. Cl.
CPC ........ *G06F 3/04883* (2013.01); *H04N 21/4126* (2013.01); *H04N 21/41407* (2013.01); *H04N 21/42202* (2013.01); *H04N 21/43637* (2013.01); *H04N 21/4524* (2013.01); *H04N 21/4788* (2013.01); *H04W 4/06* (2013.01); G09G 2300/026 (2013.01); H04M 1/7253 (2013.01); H04M 2250/64 (2013.01)

(58) Field of Classification Search
CPC ..... G06F 3/1446; G06F 1/1647; G06F 3/041; G09G 2300/026; G09G 2356/00; G09G 2360/04; G09G 3/04883; H04M 1/7253; H04M 2250/64; H04N 21/4126; H04N 21/41407; H04N 21/43637; H04N 21/4788; H04W 4/06
USPC ..................... 345/1.1, 1.3, 156–173; 715/863
See application file for complete search history.

(56) References Cited

U.S. PATENT DOCUMENTS 7,532,196 B2 *  5/2009  Hinckley ...................... 345/156
8,077,157 B2 * 12/2011  Sengupta et al. ............ 345/173
(Continued)

FOREIGN PATENT DOCUMENTS

| GB | 2 378 878 A | 2/2003 |
| JP | 7-199881 A | 8/1995 |
| WO | WO 2009/114394 A1 | 9/2009 |

OTHER PUBLICATIONS

"How to Merge Two Monitors Together," dated Feb. 25, 2011 (http://www.ghotta.com/2011/02/26/how-to-merge-two-monitors-together/).

(Continued)

*Primary Examiner* — Hong Zhou
(74) *Attorney, Agent, or Firm* — Ditthavong & Steiner, P.C.

(57) ABSTRACT

An approach is provided for sharing media in a multi-device environment. A group of devices for sharing one or more media files is determined. A shared media manager causes joining of one or more displays of the devices. The shared media manager then determines to generate a common user interface for presenting the one or more media files on the joined one or more displays.

14 Claims, 15 Drawing Sheets

(51) Int. Cl.
*H04N 21/4363* (2011.01)
*H04N 21/45* (2011.01)
*H04M 1/725* (2006.01)

(56) References Cited

U.S. PATENT DOCUMENTS

| | | | |
|---|---|---|---|
| 8,253,649 B2* | 8/2012 | Imai et al. | 345/1.3 |
| 2005/0168399 A1* | 8/2005 | Palmquist | 345/1.1 |
| 2006/0094480 A1 | 5/2006 | Tanaka | |
| 2007/0146347 A1* | 6/2007 | Rosenberg | 345/173 |
| 2008/0216125 A1 | 9/2008 | Li et al. | |
| 2009/0017799 A1* | 1/2009 | Thorn | 455/414.1 |
| 2009/0213032 A1* | 8/2009 | Newport et al. | 345/1.1 |
| 2009/0273560 A1 | 11/2009 | Kalanithi et al. | |
| 2010/0156812 A1 | 6/2010 | Stallings et al. | |
| 2010/0171691 A1 | 7/2010 | Cook et al. | |
| 2010/0257251 A1* | 10/2010 | Mooring et al. | 709/216 |
| 2010/0287513 A1* | 11/2010 | Singh et al. | 715/863 |
| 2011/0081923 A1* | 4/2011 | Forutanpour et al. | 455/457 |
| 2011/0209103 A1* | 8/2011 | Hinckley et al. | 715/863 |
| 2012/0062475 A1* | 3/2012 | Locker et al. | 345/173 |

OTHER PUBLICATIONS

"Mobile Multi Display system by UMIC-RWTH of Aachen University," Feb. 22, 2011, (http://armdevices.net/2011/02/22/mobile-multi-display-system-by-umic-rwth-of-aachen-university/).

Lyons, et al., "Multi-Display Composition: Supporting Display Sharing for Collocated Mobile Devices," Intel Research (http://berkeley.intel-research.net/~brosario/papers/interact09.pdf).

U.S. Appl. No. 12/756,796, filed Apr. 8, 2010, Jaakko Olli Taavetti Keränen et al.

U.S. Appl. No. 12/757,754, filed Apr. 9, 2010, Juha Henrik Arrasvuori et al.

U.S. Appl. No. 12/872,680, filed Aug. 31, 2010, Arrasvuori et al.

U.S. Appl. No. 12/913,549, filed Oct. 27, 2010, Juha Henrik Arrasvuori et al.

Pass-Them-Around: Collaborative Use of Mobile Phones for Photo Sharing, Lucero et al., CHI 2011, May 7-12, 2011, Vancouver, BC, Canada, pp. 1-10.

Synchronous Gestures in Multi-Display Environments, Ramos et al., Human-Computer Interaction, 2009, vol. 24, pp. 117-169.

* cited by examiner

100

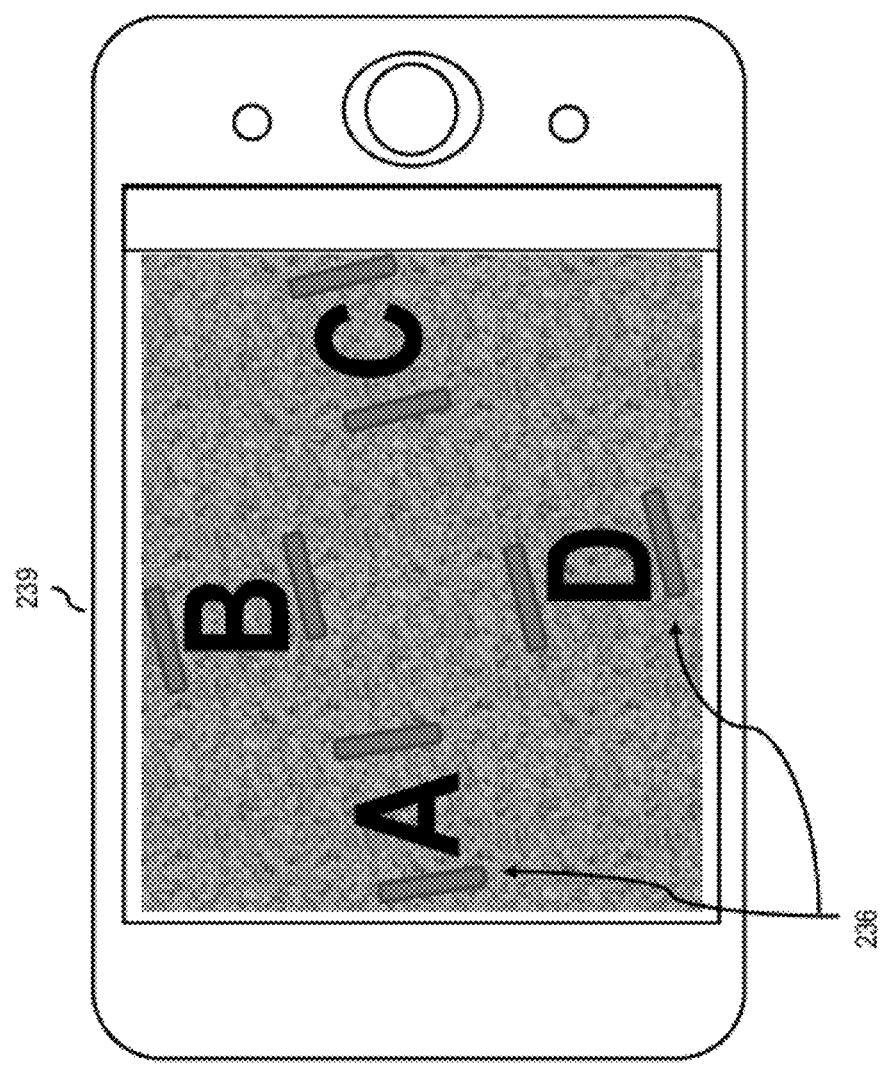

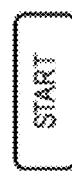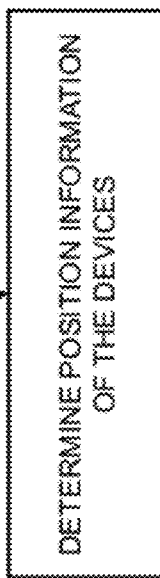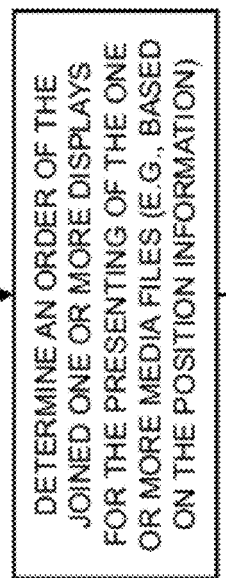
FIG. 3D
316
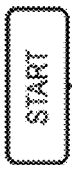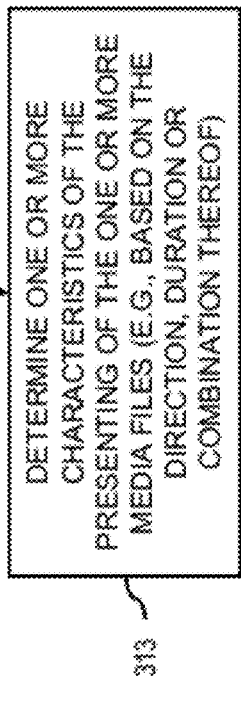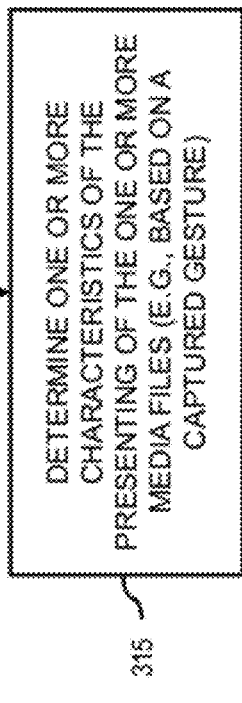
FIG. 3C
310

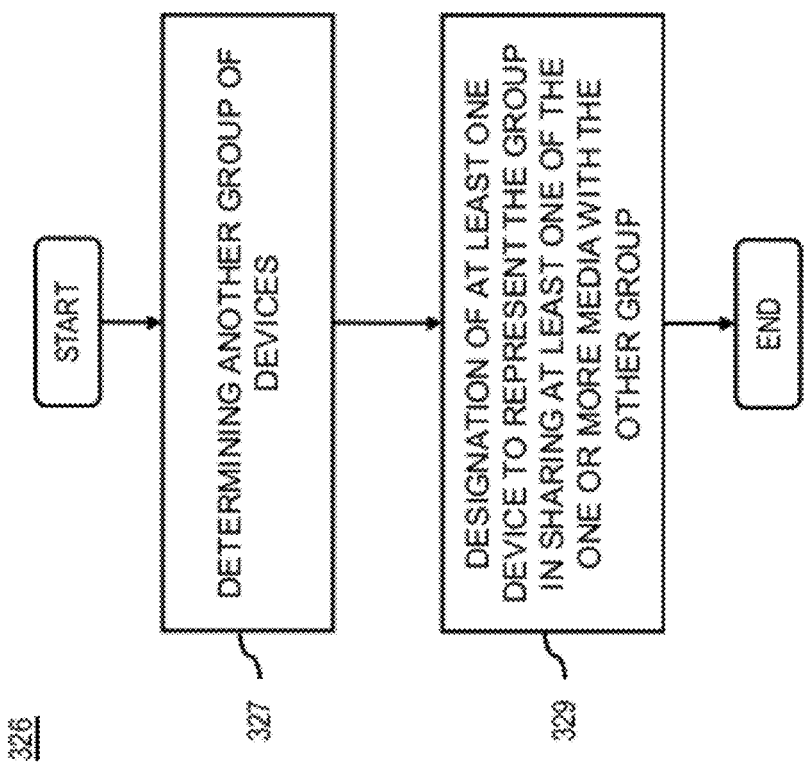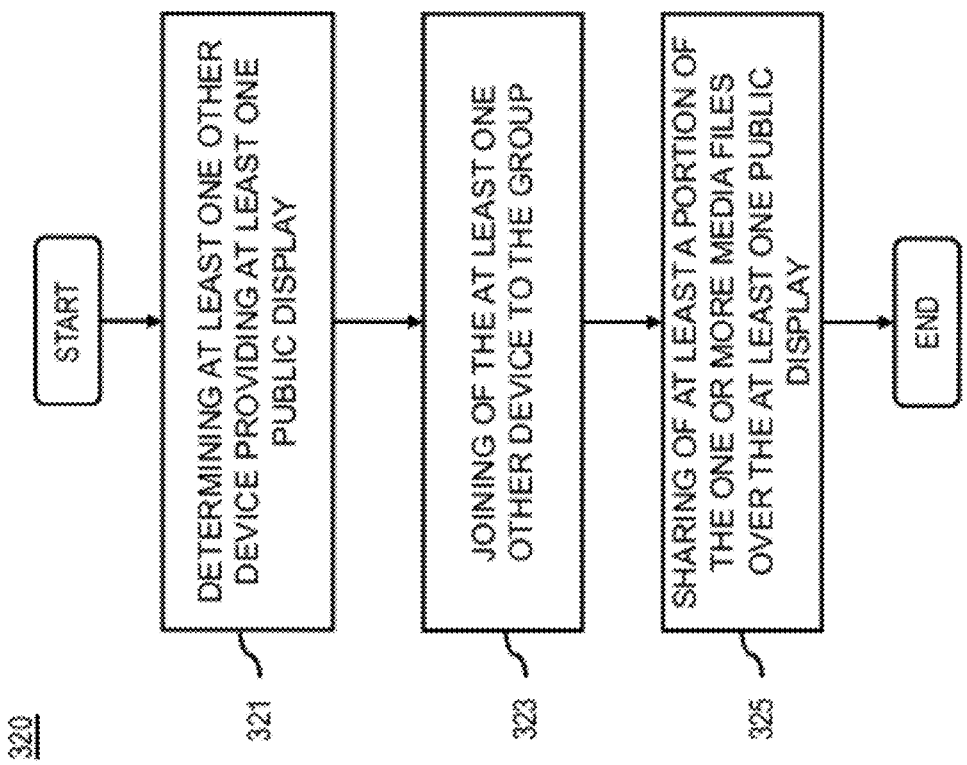

METHOD AND APPARATUS FOR SHARING MEDIA IN A MULTI-DEVICE ENVIRONMENT

BACKGROUND

Mobile devices are rapidly becoming the computing device of choice for today's tech-savvy, on-the-go users. Very often, mobile device users engage in real-time collaborative processing tasks such as photo sharing, video sharing and the exchanging of other media or content. Historically, various social networking and file sharing applications are provided for facilitating this kind of interaction over a network. In this way, users may engage with one another to share photos, music and other media even when they are remotely located. However, service providers and device manufacturers face significant technical challenges to support file sharing and related interactions among multiple devices, particularly with respect to small form factor devices such as mobile devices.

SOME EXAMPLE EMBODIMENTS

Therefore, there is a need for an approach to sharing media in a multi-device environment.

According to one embodiment, a method comprises determining a group of devices for sharing one or more media files. The method also comprises causing, at least in part, joining of one or more displays of the devices. The method also comprises determining to generate a common user interface for presenting the one or more media files on the joined one or more displays. A manipulation of the common user interface is based, at least in part, on a command, a movement, or a combination thereof associated with one or more of the devices.

According to another embodiment, an apparatus comprises at least one processor. The apparatus also comprises at least one memory including computer program code for one or more computer programs, the at least one memory and the computer program code configured to, with the at least one processor, cause the apparatus to determine a group of devices for sharing one or more media files. The apparatus is also caused to join one or more displays of the devices. The apparatus is further caused to determine generate a common user interface for presenting the one or more media files on the joined one or more displays. A manipulation of the common user interface is based, at least in part, on a command, a movement, or a combination thereof associated with one or more of the devices. The apparatus is also caused to handle audio playback by multiple devices depending on the location of the devices and number of audio channels in a media file.

According to another embodiment, a computer-readable storage medium carrying one or more sequences of one or more instructions which, when executed by one or more processors, cause an apparatus to determine to detect location information associated with a plurality of devices. The apparatus is also caused to join one or more displays of the devices. The apparatus is further caused to determine to monitor movement of one or more of the devices. The apparatus is further caused to determine to generate a common user interface for presenting the one or more media files on the joined one or more displays. A manipulation of the common user interface is based, at least in part, on a command, a movement, or a combination thereof associated with one or more of the devices.

According to another embodiment, an apparatus comprises means for determining a group of devices for sharing one or more media files. The apparatus also comprises means for causing to join of one or more displays of the devices. The apparatus further comprises means for determining to generate a common user interface for presenting the one or more media files on the joined one or more display. A manipulation of the common user interface is based, at least in part, on a command, a movement, or a combination thereof associated with one or more of the devices.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (including derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing any of the methods disclosed herein.

Still other aspects, features and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIGS. 2A-2K are diagrams of several user equipment interacting through a common interface for sharing digital media, according to various embodiments;

FIGS. 3A-3F are flowcharts depicting processes for enabling a group of devices to interact through a common interface for sharing digital media, according to various embodiments;

DESCRIPTION OF SOME EMBODIMENTS

Examples of a method, apparatus, and computer program for sharing media in a multi-device environment are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Although the various exemplary embodiments are described with respect to the sharing of media files such as photos, it is contemplated that these embodiments have applicability to any data protocols, methodologies or systems for sharing, editing or otherwise processing media of various types including audio, video, textual, contextual and the like.

Figure 1:
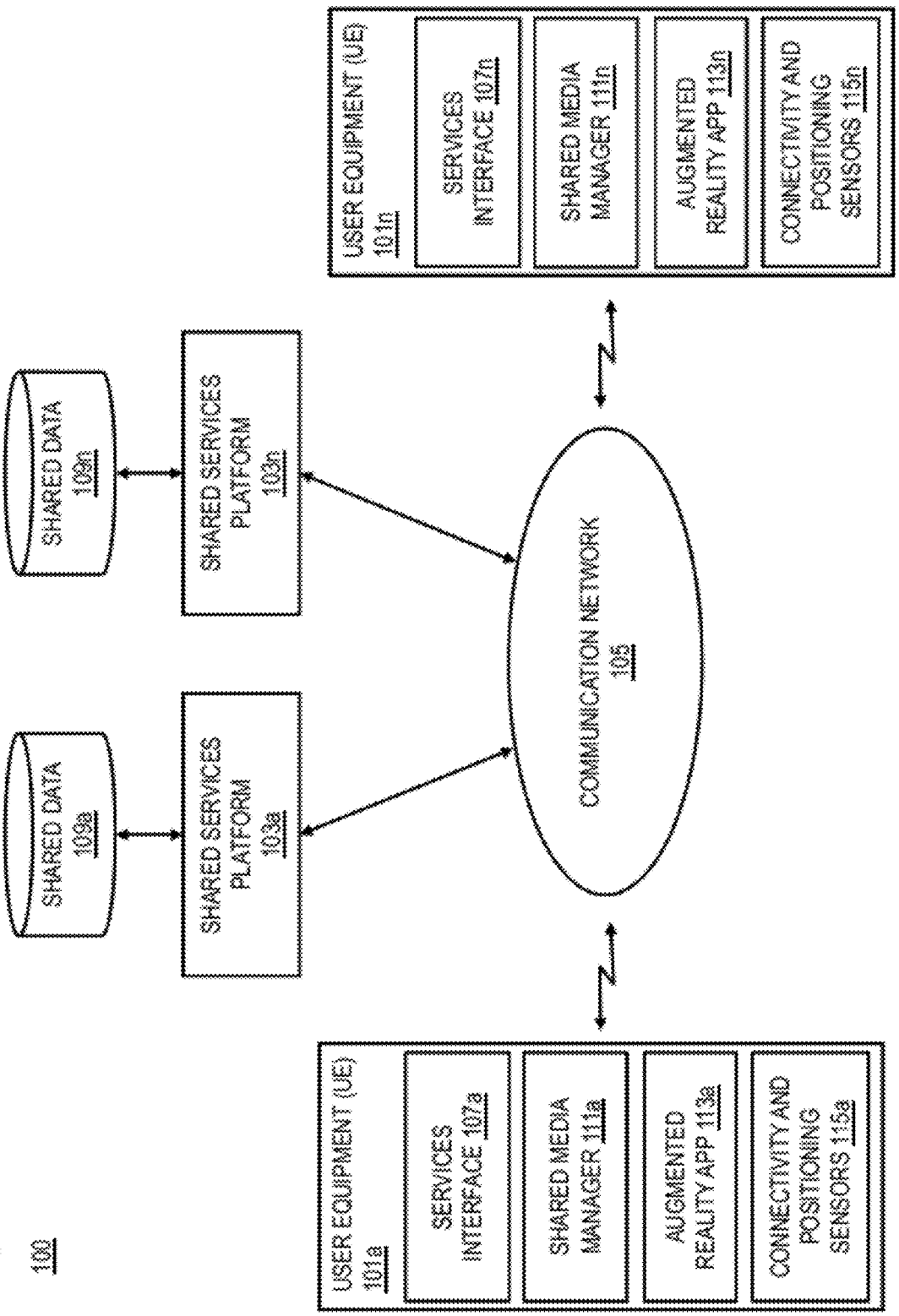
FIG. 1 is a diagram of a system capable of sharing media in a multi-device environment, according to one embodiment.

FIG. 1 is a diagram of a system capable of sharing media in a multi-device environment, according to one embodiment. By way of example, the system enables the common user interface to be created based on physical and/or network proximity of respective devices, one or more actions, gestures or movements performed with respect to one or more devices, a particular command executed with respect to a shared application or task among the devices, or a combination thereof.

Typical mobile devices such as cell phones, Smartphones and the like are designed primarily for mobility. Consequently, they feature small visual displays that are intended primarily for enabling a single user to view a limited amount of information at a time. With the increase in social networking, shared computing, media file sharing and other tasks requiring interaction among several users concurrently, limited visual capacity and collaborative capability among devices inhibits the overall user experience. This is because the quality of experience of a mobile device user as they engage with others for performing shared activities depends on various factors.

One such factor affecting the ability of users to collaborate to perform shared activities, such as the mutual concurrent reviewing of media files, includes the ability of respective devices to interact via a common interface. For example, several devices may be configured to exchange data with one another by way of a proximity based data connection (e.g., near field communication) or common network connection. However, even though these devices are able to communicate and share data such as media files, their respective displays are limited to presenting data only from the perspective of a single device user rather than from a collaborative group perspective.

Another factor that limits the ability of users to share media files such as photos, music, pictures and the like is the lack of defined protocols and controls for enabling data to be seamlessly passed along to collaborating devices. By way of example, when one device user wishes to pass along photos or other media files to other device users comprising a group, they must transmit the files to each device individually. Unfortunately, there is currently no convenient means of facilitating an interface, interaction protocols and methods for sharing and displaying media files (such as digital photos or videos) in a multi-display or multi-device environment for multiple users concurrently.

To address this issue, the approach described herein pertain to methods and systems for enhancing the ability of user equipment to share, edit, execute and view media files collaboratively through the establishment of a common user interface. Establishment of the common user interface enables the user to perform various actions for facilitating file sharing, interaction and exchange by way of simple movements, gestures and positional adjustments of respective user devices. In certain embodiments, the term "common user interface" refers to any display generated for presenting the interaction of one or more collaborating devices. By way of a common user interface, the displays of multiple independent devices are engaged to interact with one another on an interdependent basis, such that adaptations, updates, content refreshment or other characteristics of one display affects the operation, function or perspective of another display.

Also, in certain embodiments, a "workspace" refers to the proximal amount of physical or virtually perceivable space made available to a device user for interacting with others for performing various shared processing or communication tasks (work). By way of example, a "virtual workspace" as presented herein pertains to any virtually or physically perceivable space, area, plane or surface, whether locally or remotely situated, over which one or more user devices can engage one another to enable media file sharing and collaboration. Within the workspace, a user can perform one or more shared services with other users associated with the workspace, including sharing media files, executing media files, reviewing media files, editing media files, deleting media files and any other means of media file processing. As will be discussed more fully later on, for example purposes, a workspace may be established based on the detection of a physical plane upon which one or more devices are arranged as well as based on a range, proximity or mode of communication over a network by the one or more devices.

The system 100 comprises different user equipment (UE) 101a-101n (also collectively referred to as UE 101 or user devices 101) having connectivity to one or more shared services platforms 103a-103m (also collectively referred to as shared services platform 103) via a communication network 105. In certain embodiments, each of the UE 101 includes respective services interfaces 107a-107n (also collectively referred to as services interfaces 107). As an example, the services interface 107 allows the respective UE 101 to exchange or share data over the network 105 with other UE 101. The data can be any content, information or applications intended to be stored to and retrieved from the shared services platform 103 as shared media data 109 (also collectively referred to as shared data 109). This can include, but is not limited to, images, video, audio, contact list data, executable instruction sets such as applets, documents, message threads, profile data, visual descriptors, etc. By way of example, the services interface 107 may be a dedicated media management application (e.g., implemented as a web service) for enabling the sharing of photos or other media files, an internet browser through which the user may establish a session with the shared services platform 103, or the like. It is noted that the services interface 107a may be configured to operate in connection with any existing media applications residing on the UE 101. As such, media files may be translated for collaboration among UE 101a-101n across differing operating systems, device types, resource requirements, software capabilities and the like.

The shared services platform 103 pertains to any hosted (or even client/server based) applications intended to promote the exchange of data, enable concurrent processing capability between users or facilitate interactive or real-time communication between one or more registered users of said service. Examples include, but are not limited to social networking service providers such as Facebook®, MySpace® and LinkedIn®, shared content and application processing providers such as Google Apps® by Google®, Exchange® or Office Live® by Microsoft® and Huddle® applications, various cloud computing or shareware/groupware providers, or the like. In general, the shared services platforms provide differing capabilities to users who collaborate with one another using it, including but not limited to contact and profile management—i.e., for the user and his/her social or business network contacts), discussion/chat rooms, whiteboards, photo sharing, document creation and management, project management, permissions and restrictions management, meeting and conference management, content/user/data search capability, shared dashboard capability, etc. As capabilities and providers differ vastly, many of the aforementioned capabilities are generally integrated in the shared services platform 103. Hence, any platform for facilitating collaboration between users is within the scope of the inventive concepts presented herein.

In general, the services interface 107 and the shared services platform 103 communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application headers (layer 5, layer 6 and layer 7) as defined by the OSI Reference Model.

By way of example, the communication network 105 of system 100 includes one or more networks such as a data network (not shown), a wireless network (not shown), a telephony network (not shown), or any combination thereof. It is contemplated that the data network may be any local area network (LAN), metropolitan area network (MAN), wide area network (WAN), a public data network (e.g., the Internet), or any other suitable packet-switched network, such as a commercially owned, proprietary packet-switched network, e.g., a proprietary cable or fiber-optic network. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), satellite, mobile ad-hoc network (MANET), personal area network (PAN) (e.g., a Bluetooth® PAN), proximity based protocols (e.g., near field communication (NFC), ZigBee, infrared), and the like.

In addition to the services interface 107, each UE 101 features respective shared media managers 111a-111n (also collectively known as media managers 111) and augmented reality applications 113a-113n (also collectively known as augmented reality applications 113). In certain embodiments, the shared media manager 111 includes one or more components for generating a virtual workspace (e.g., devices may join a session through user commands such as by setting up a session from a menu) among a plurality of UE 101 based, at least in part, on the location information of the UE 101, and then enabling UE to collaborate over the workspace based on the movement of respective devices, users or a combination thereof. By way of example, the shared media manager 111 may be used to depict a user interface of one or more applications, services or the like that are common to the UE 101. In certain embodiments, the shared media manager may be presented concurrently to the UE 101 as a mutually accessible/viewable corkboard, whiteboard, bulletin board, table, desktop, platform or other common workspace. It is contemplated that the functions of the shared media manager 111 may be combined in one or more components or performed by other components of equivalent functionality (e.g., the shared services platform 103).

In certain embodiments, once the virtual workspace is created by the shared media manager 111, the UE 101 enables the augmented reality applications 113 to generate real-time representations of the virtual workspace environments with virtual computer-generated imagery. More specifically, the view of the workspace is modified or generated by the application 113 and/or the shared media manager 111 based, at least in part, on an orientation (e.g., location, directional heading, tilt angle, etc.) of the UE 101 relative to the virtual workspace. For example, when one or more UE 101a-101n access a shared services platform 103 for viewing pictures and one of the devices is lifted above the plane of interaction of respective devices, this orientation may be translated into a command for generating a corkboard view. Resultantly, the augmented reality application 113 and/or the shared media manager 111 may depict, for instance, a virtual corkboard showing a view of the pictures viewed by each of the UE 101 as presented affixed to a corkboard. The application 113 and/or the shared media manager 111 may render computer imagery in connection with the corkboard view for representing tape, stick pins, stitching and other graphic elements for juxtaposition atop or with respect to a particular photo, document, video or other media file maintained as shared data 109a-109n. In certain embodiments, the user interfaces of the respective UE 101 are partial views to the virtual workspace. Moreover, each of the devices may have different views of the workspace at different zoom levels.

In certain embodiments, physical movements of the UE 101 correspond to equivalent movements in the virtual workspace or are translated into commands for affecting the presentation of a virtual workspace. These movements (e.g., panning along the virtual workspace) can be used, for instance, to locate virtual objects within the virtual workspace, select the objects, change the properties of the objects, and the like. The location, selection, and changing of the properties can be further specified by different movements (e.g., rotation of the UE 101, alignment of the UE 101, etc.).

In general, the UE 101 is any type of mobile terminal, fixed terminal, or portable terminal including a mobile handset, station, unit, device, multimedia computer, multimedia tablet, Internet node, communicator, desktop computer, laptop computer, Personal Digital Assistants (PDAs), or any combination thereof. It is also contemplated that the UE 101 can support any type of interface to the user (such as "wearable" circuitry, etc.). Moreover, the UE 101 may execute one or more software applications or utilities, including but not limited to those for enabling or facilitating network access and communication, internet browsing, social networking, e-mail communication, file sharing and data transfer, word processing, data entry, spreadsheet processing, mathematical computation, photo album viewing, etc. These applications and utilities may also be interoperable, so as to enable the execution of various features of the aforementioned application and utilities to be simultaneously executed to enable specific user tasks. Data generated by or exchanged with the device, such as by other devices or by way of the shared services platform 103, can be stored to a datastore or memory (not shown) of the UE 101.

Each UE may also have operable thereon one or more connectivity and positioning sensors (CPS) 115a-115n (also collectively referred to as CPS 115) for enabling respective devices to detect the location of other devices relative to its current position, orientation or movement. Furthermore, the CPS 115 enables communication sessions to be established between detected devices to facilitate a means of exclusive communication between the devices for creating the virtual workspace and/or manipulating the services and/or applications depicted in the virtual workspace. By way of example, the CPS 115 is a positioning system that combines ultrasonic and inertial positioning sensors to detect changes in movement, position, orientation (e.g., tilt or skew) or presence of other devices or UE 101.

In certain embodiments, the inertial positioning sensors of the CPS 115 are employed using gyroscopes, accelerometers and compass technology. Momentary positions and gestures are persistently calculated as well using the data collected by these devices. Consistent observance of relative positional change is performed for each device individually, as well as relative to each other. This capability facilitates collaborative communication among complimentarily placed devices and enables respective devices to perform shared application or media file usage.

FIGS. 2A-2J are diagrams of several user equipment interacting to generate a common interface for sharing digital media, according to various embodiments. For the purpose of illustration, the diagrams are described with respect to an exemplary use case of a group of device users that wish to share photographs with one another by way of common, locally shared interface. Under this scenario, each of the interacting user devices are implemented with at least a shared media manager 111 for enabling interaction with the shared services platform 103. It is noted that while the user interface depictions correspond to means for enabling group based device collaboration and media file sharing, the devices may be configured to cause the presentation of various additional screens based on interaction of devices with the shared services platform 103.

Figure 2A:
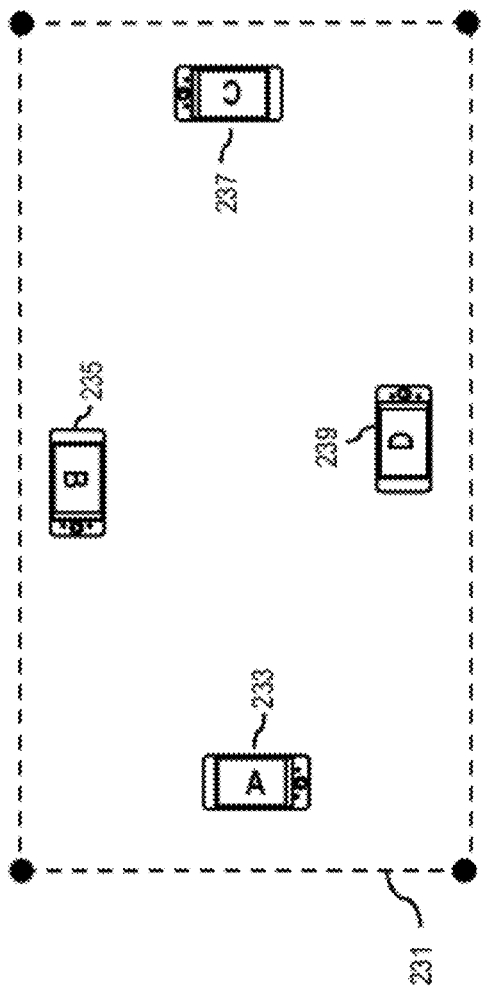

In FIG. 2A, a group of user devices 233-239 are placed along a surface 231 (e.g., on a table) or within close proximity of one another in various orientations. The surface 231 upon which the devices 233-239 are physically placed may be established as a virtual workspace by the shared media manager 111 of respective user devices. As noted, the shared media manager 111 of each device may interact with a corresponding connectivity and positioning sensors of the device or other devices, such as to determine the presence of the other devices, determine its own position information and that of the other devices, determine its own connection and device characteristics and that of the other devices, or a combination thereof. By way of this interaction, a connection is established and a group of devices for sharing one or more media files is determined.

Under this scenario, each device executes a services interface 107 that provides access to a media viewer application, photo viewer, image editor, media manager or the like. As noted previously, the services interface 107 may interact with the shared services platform 103 for enabling respective user devices 233-239 to access photos maintained remotely as shared data 109. Alternatively, the services interface 107 may correspond to locally held photo data and/or a local media viewing application. User devices 233-239, in this example, have access to individual or sets of photos labeled A-D respectively.

The shared media manager 111 operates in connection with the connectivity and position sensors to detect the movement, orientation or position of the device for enabling photos A-D to be shared. By way of example, as shown with respect to FIG. 2D, the user of device 239 may tilt the device forward towards the center of the table to initiate the photo sharing process. Under this scenario, this results in the presentation of a corkboard view to devices 233-237 and also establishes device 239 as a primary device for leading the media sharing process. It is noted that the corkboard represents a common user interface being shared amongst the various user devices. Having established the sharing process, the devices may interact in various ways to share and receive photos.

Figure 2B:
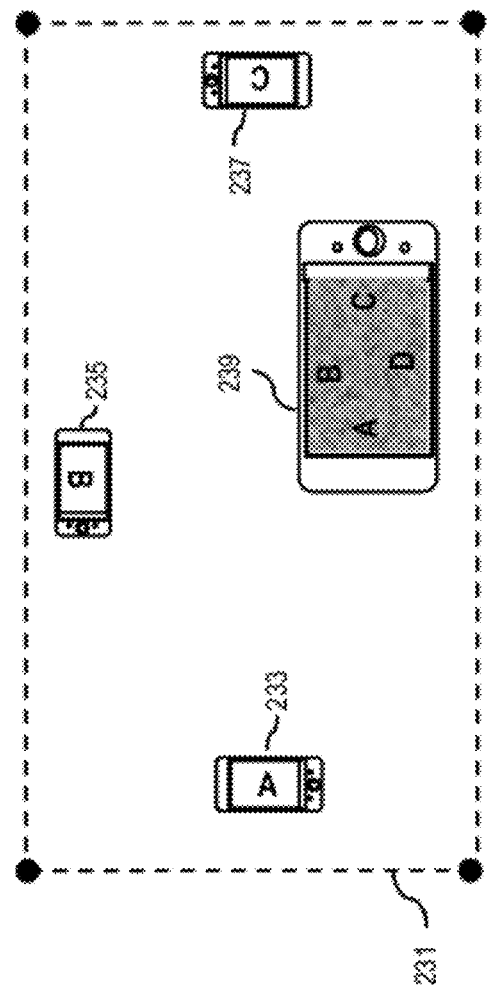
Figure 2D:
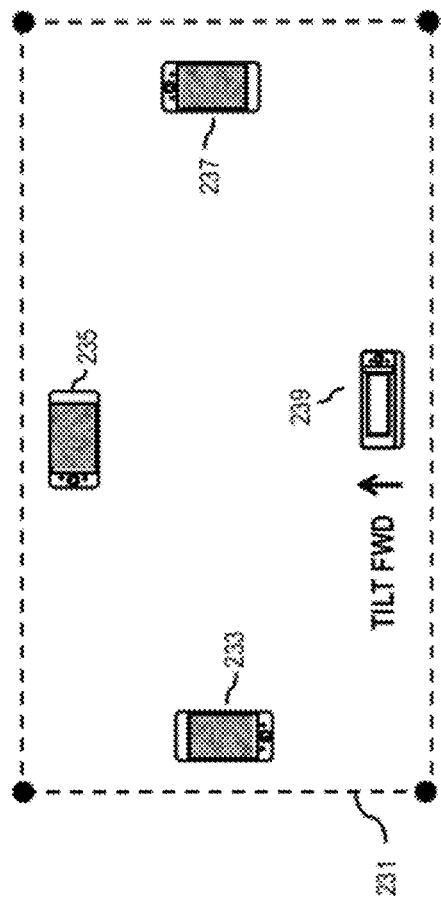

In FIG. 2B, a user of one of the devices 239 lifts the device above the virtual/physical plane 231. This action causes the shared media manager 111 of the device 239 to generate an overview to the display of the device 239. The overview is presented as a virtual depiction of photos A-D as positioned on a corkboard. The positions of the photos generated on the corkboard correspond to the relative physical position of the user devices 233-237 as placed on the surface 231. The representative orientations of the photos, however, are maintained for presentation in the overview according to the orientation of device 239. By way of example, FIG. 2C presents an expanded view of user device 233 as it displays the overview via a common interface.

As shown, photos A-C are shown to depict the same orientation as that of photo D in the overview presentation even though the orientation of photos A-C at respective devices 233-237 of FIG. 2B match the orientation of the displaying device. It is noted, therefore, that the orientation of photos may automatically be adjusted to accommodate the orientation of the device to which a photo or other media file is being passed. Also, as mentioned, the overview may be presented by the shared media manager application of respective devices in connection with the augmented reality application; wherein additional computer generated imagery such as frame elements 236, text, graphics, icons, etc., are juxtaposed with respective photos A-D. It is noted that the overview provides the user with a high level perspective of the various devices and photos available for accessing or sharing.

Figure 2E:
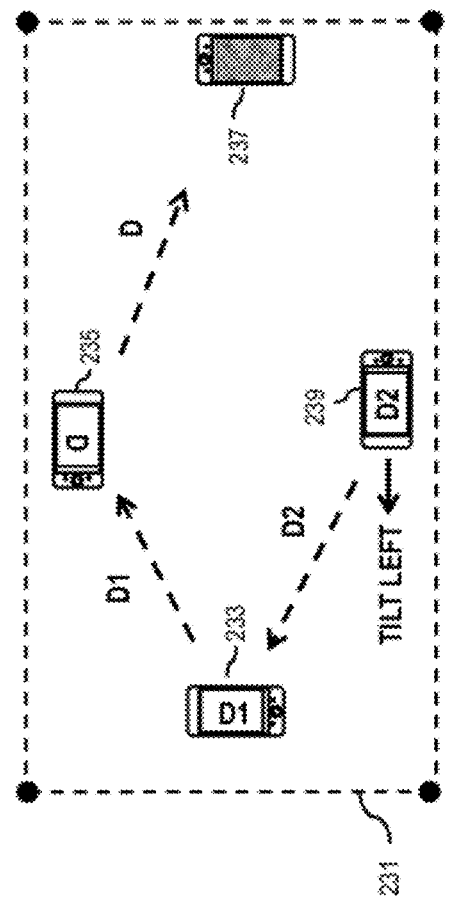

Another means of media sharing is depicted in FIG. 2E. By way of example, the user of device 239 tilts the device left (or right) to begin passing the photo D or collection thereof to successively placed devices corresponding to the leftward tilt. Under this scenario, an initial picture D is passed to from the initiating device 239 to each subsequent device one-by-one, in order of device succession (233 to 235 to 237). As the photo is passed from one device to the next, subsequent photos D1 and D2 of the collection are passed along in the same manner. It is noted that this mode of interaction is similar to passing hardcopy photos and prints around from one viewer to the next in a circle.

The rate at which photos of the collection D are passed along depends on the amount of tilt applied to the initiating device 239. The steeper the angle of tilt, whether the initial tilt is leftward or rightward, the faster the advancement of photos. Also, the order of succession of devices is determined through analysis of the spatial relationship between the initiating device 239 that is sharing the photos (e.g., the primary or photographer's device), and the other devices of the virtual workspace.

Figure 2F:
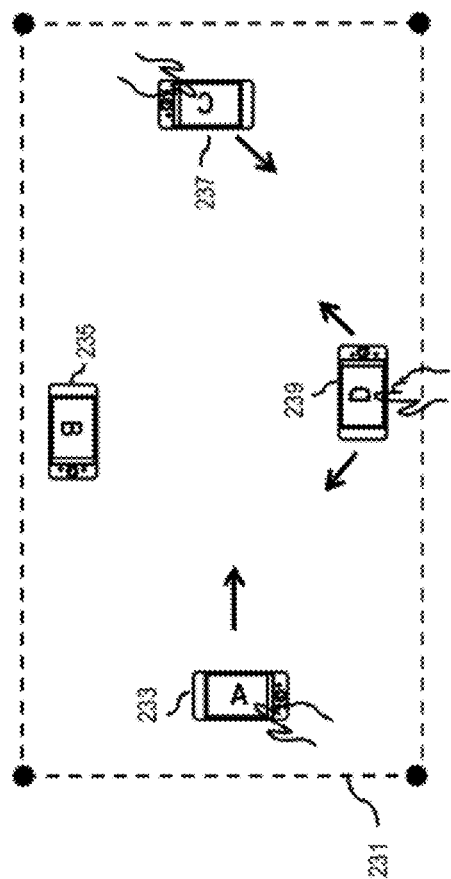

FIG. 2F depicts yet another means of interaction between devices for enabling media files to be shared. Respective users of devices 233-239 may pass photos around to others within the group by performing a flicking motion (using their finger, stylus or other device) at the device touch screen in the direction of recipient device. For example, upon receipt of the appropriate user input (e.g., flicking motion), device 239 can advance photo D in a diagonal direction towards device 233 or 237. Likewise, device 233 may flick photo A towards device 237.

All devices are free to pass photos and other media files along in this manner as they would with physical print photos. Of note, the orientation of the photo as passed along from one device to another is adapted to accommodate the current orientation of the receiving device. In another embodiment, however, when a user in landscape orientation sends a photo to a device oriented in portrait, the photo at the receiving device may be shown as comprising the entire display of the device or exceeding the viewing margins of the portrait orientation. To view the photo as sent, the receiving device user may rotate their device to a corresponding landscape orientation for viewing the portrait appropriately.

In certain embodiments, a photo that is passed from one device may be edited by one or more of the other devices. By way of example, photo D at device 239 may be flicked/passed along to device 237, where the photo is subsequently edited by the user of device 237. The user at device 237 may then pass the edited version of the photo along to device 235 or back in its edited form to device 239. In certain embodiments, device 237 may be configured to ask for permission from the sending device 239 to edit the photo D. Such permissions may be prompted in response to an attempt to edit the photo at device 237 or immediately upon receipt of the photo by device 237. Alternatively, various such permissions may be predetermined in advance, such as during establishment of the virtual workspace or in accordance with a group interaction policy.

Figure 2G:
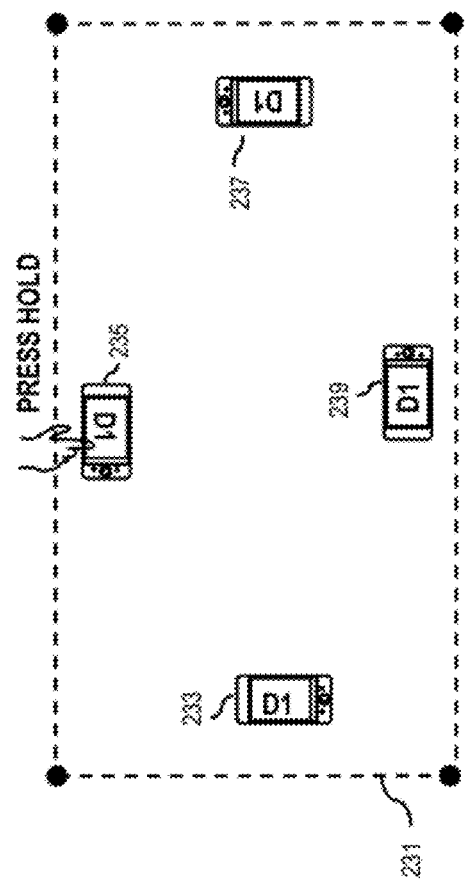

In FIG. 2G, a user of device 235 presses and holds the device touch screen to initiate a photo synchronization request. By way of this approach, when a user views a particular photo (e.g., D1) that is of particular interest, they are able to cause the same photo to be viewed on each device. This is particularly well suited for enabling the users to engage in discussion regarding a photo, or can be useful for disabling the passing around of photos to successively positioned devices. While synchronization enables the presentation of the same media or content to each display, it is noted that the common user interface is facilitated by the interdependence of each display for interaction by respective devices.

Figure 2H:
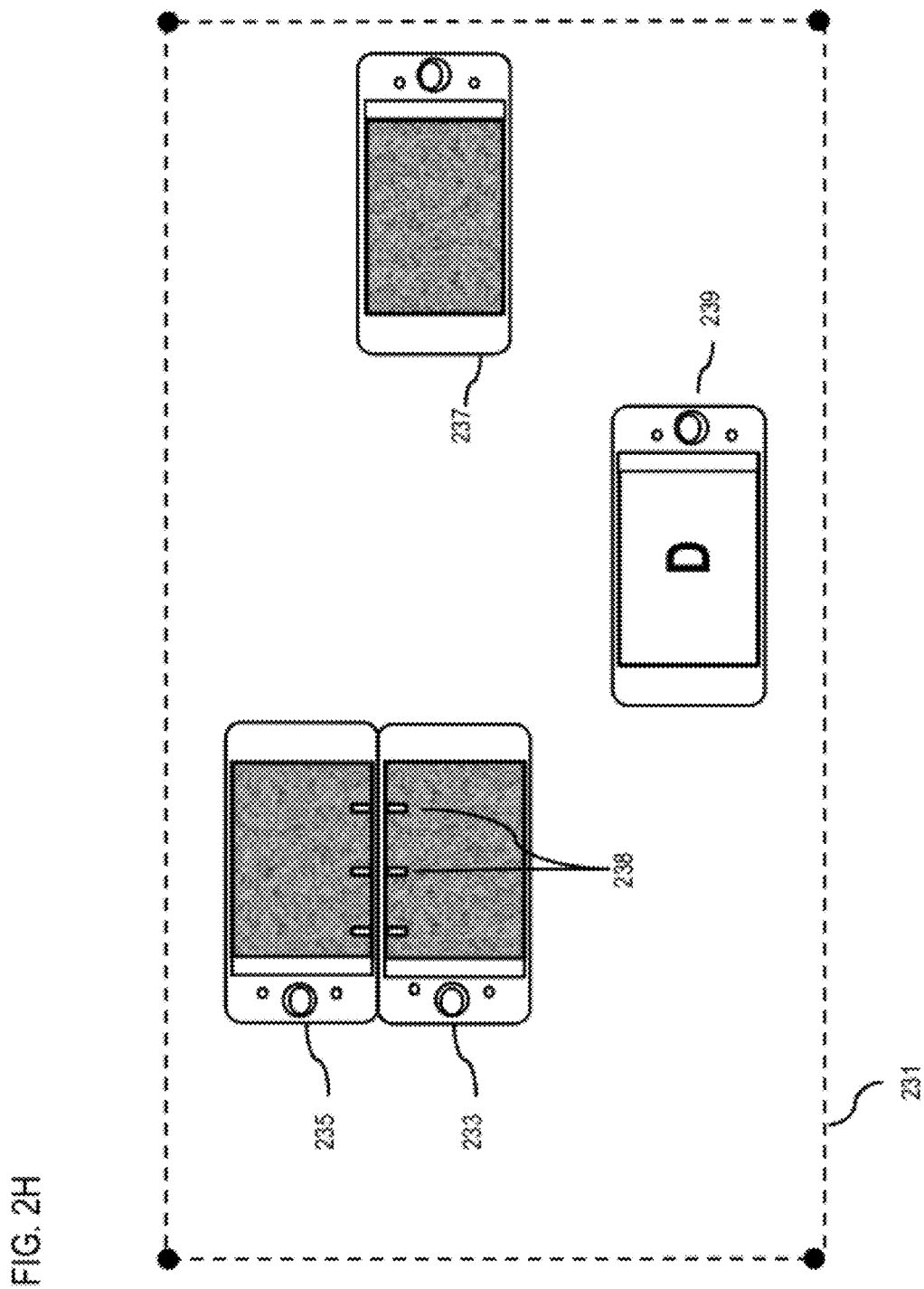
Figure 21:
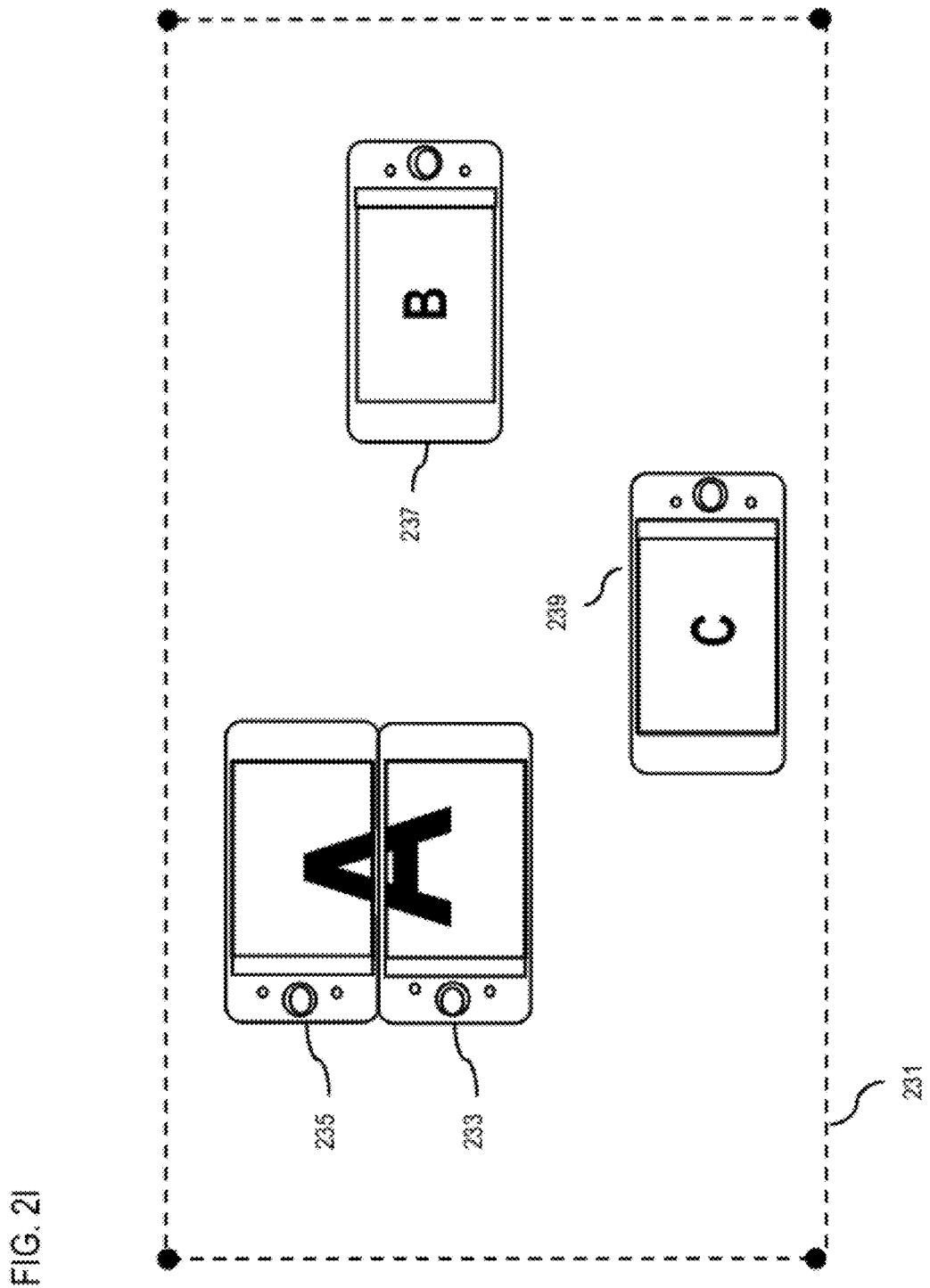
Figure 2J:
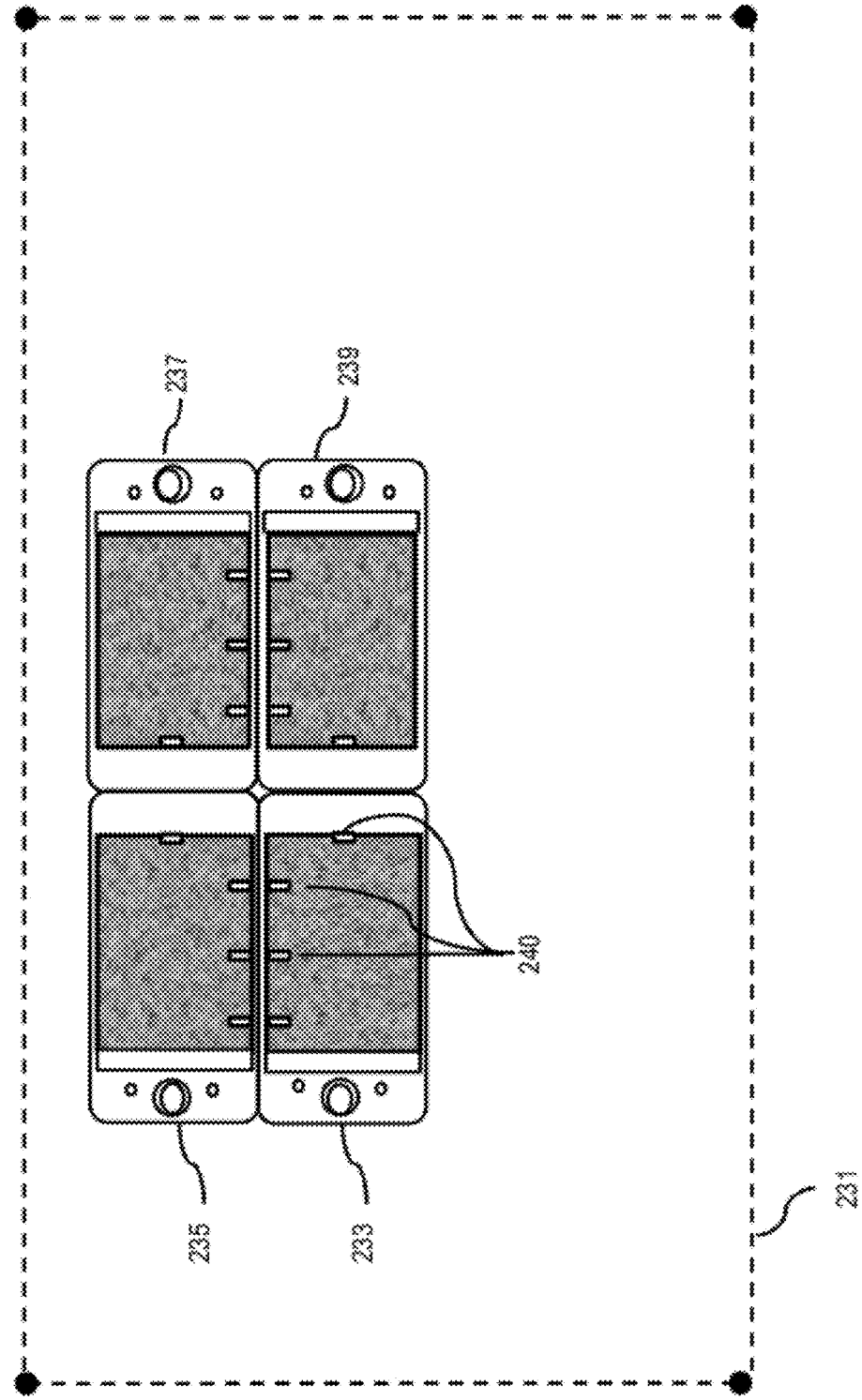

FIGS. 2H and 2I depict a means of interaction wherein multiple devices within the group are positioned next to one another to render a joined interface. By way of example, when devices 233 and 235 are positioned adjacent to one another as detected by the CPS 115, the shared media manager 111 recognizes this as a joining command. Alternatively, devices 223 and 235 may be joined by the user performing a pinching gesture on the displays of two adjacent devices. Under this scenario, the screens are presented as a corkboard that is merged and/or stitched together based on the joining. In certain embodiments, one or more stitches 238 or other computer generated imagery is presented to the display devices 235 and 233 to indicate that the devices are joined. In certain embodiments, the devices are configured to join in the various ways above by way of a joining interface. The joining interface may implemented according to a device interaction protocol or application programming instruction set for processing one or more device actions, device commands, or combinations thereof to facilitate execution of a public (common) display/interface.

It is noted that as devices 235 and 233 present the corkboard, the next successive device 237 initially takes on the corkboard view while the primary device 239 display remains the same. In FIG. 2I, however, it is shown that once the devices are joined, photo A as was originally provided by device 233 is expanded across the display of devices 233 and 235, while successively positioned/ordered devices 237 and 239 display photos B and C respectively. When the user is ready to unstitch, they simply remove one of the connected devices 235 or 233, which is interpreted by the shared media manager as the disjoin command.

It is noted that the joining command and process is equivalent to expanding the display capacity by combining two displays to create one, while also reducing the number of devices recognized for succession during the media sharing process. Under this scenario, devices 235 and 233 effectively operate as a single device. This is further illustrated with respect to FIG. 2J, which depicts a joining of all of devices 233-237. The joining is depicted by the addition of stitches 240 for representing the connection, contact or join points of respective devices.

Figure 2K:
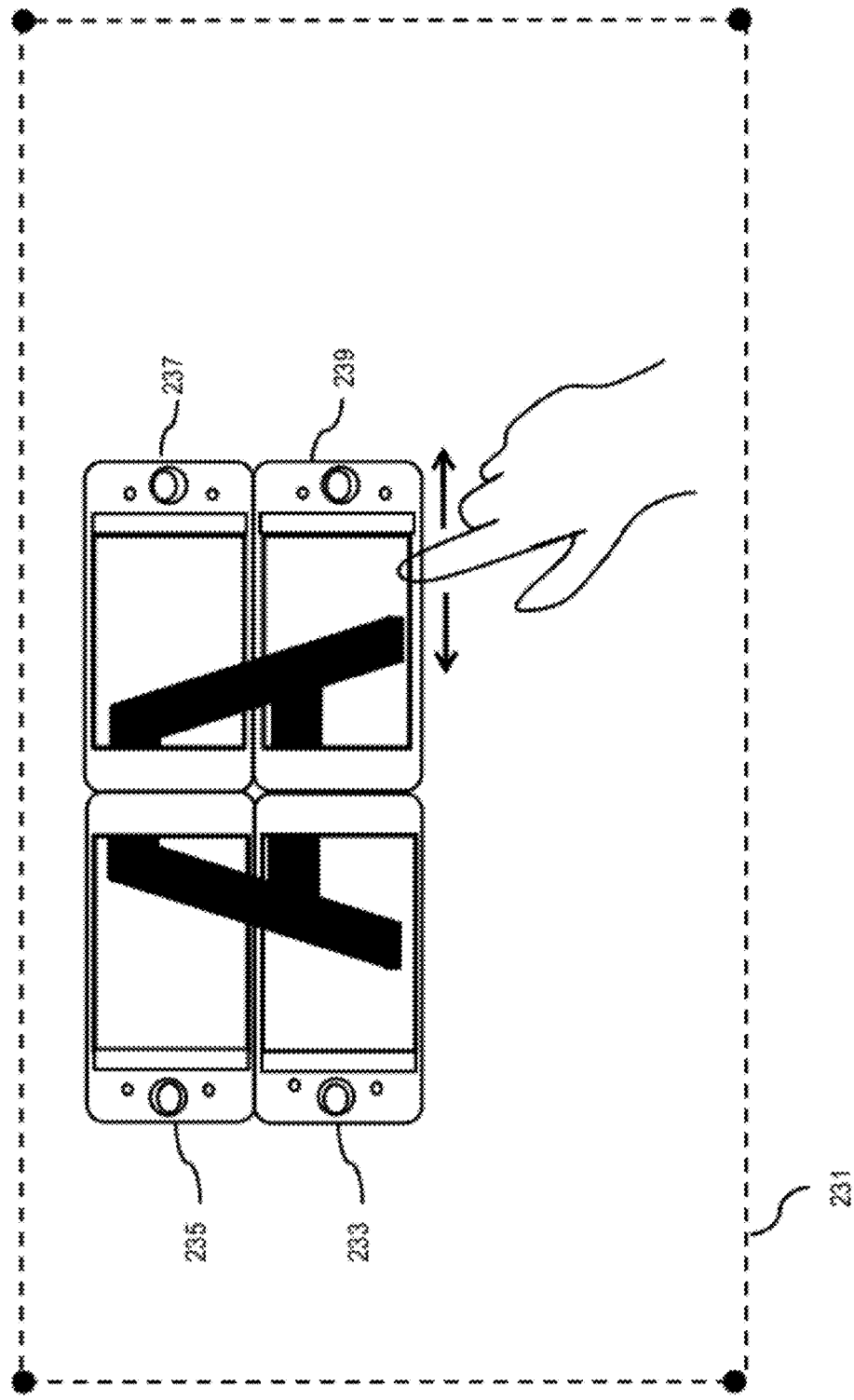
Figure 3B:
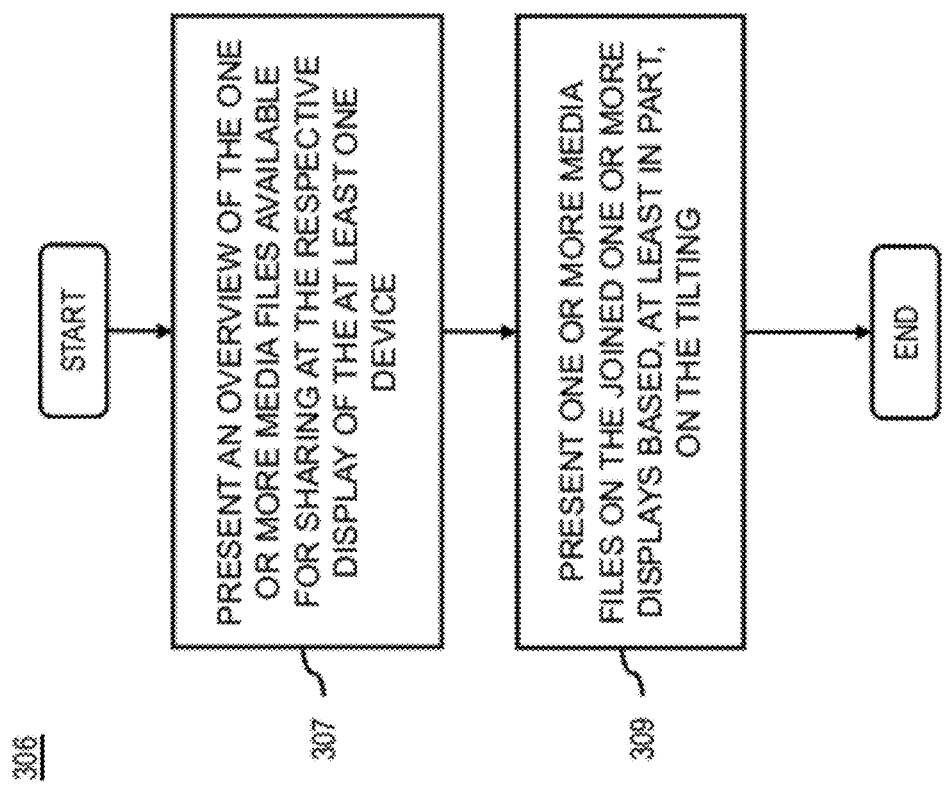
Figure 3A:
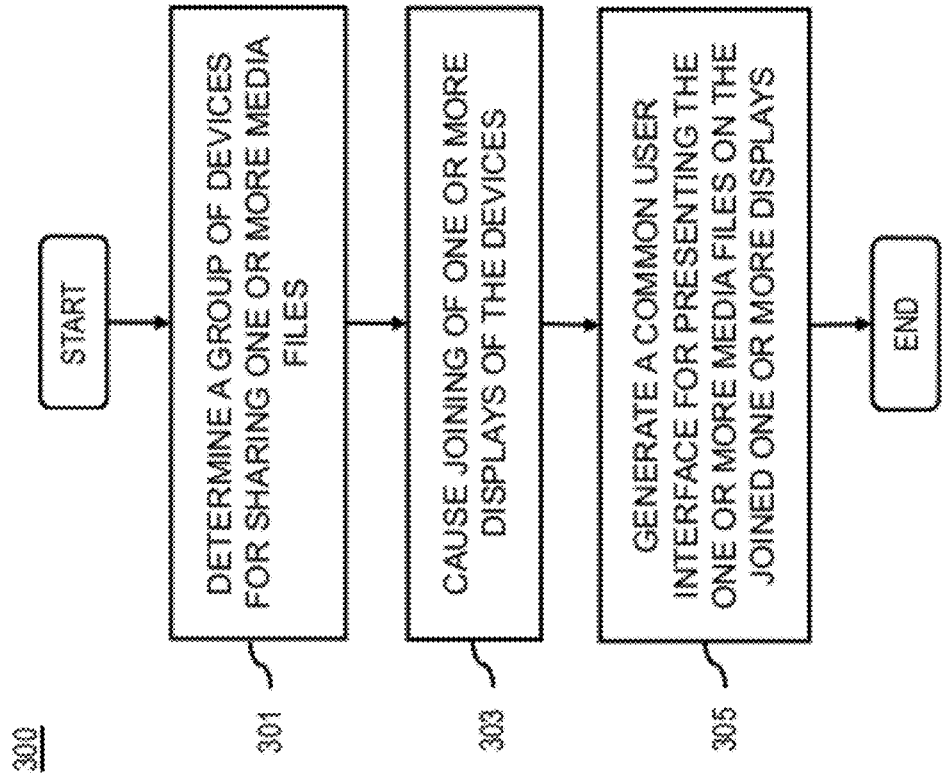

As before, the joining of the devices 233-239 results in the corkboard view being presented at each device. Also, the devices interact as a single device. As shown in FIG. 2K, photo A is expanded accordingly across the displays of each of devices 233-239. It is noted that photo A is expanded to fit multiple displays in proportion to the number of display devices being joined, the size of display devices being joined, the orientation the devices being joined, or a combination thereof. Also, the user may advance through the collection of photos by flicking or tapping their finger left or right to advance or go backward through a collection; just as they would with a single device.

It is noted that the above described interactions between devices 233-239 were carried out based on specific actions or commands caused for execution with respect to the devices. Table 1 below presents a summary of the basic commands and/or executions able to be performed with respect to a common user interface. It is contemplated that additional commands and corresponding response actions may also be employed for enabling media file sharing. To summarize, there are at least two different modes for media file sharing. These are "simultaneous" and "sequential". In simultaneous mode, all connected devices present simultaneously the same media file. In sequential mode, each connected device or group of devices presents a different media file in turn. In the beginning of the sequential mode, all devices except the "photographer's device" present an empty corkboard. As the "photographer's device" passes on the media files one at a time, each of the connected devices or groups of devices presents a different media file.

TABLE 1

Exemplary command and device execution options for enabling media sharing

1. Picking up a device leads to showing an overview ("the corkboard" metaphor) with the photos available from the different devices for sharing. The overview is shown only on the picked up device.
2. Tilting one device towards the center of the table to begin sharing a collection of photos.
3. Tilt one device sideways (either to left or right) to share a photo with a device in the direction of tilt (or to browse individual photos before sharing photos as a group has started).
4. Tilt angle of device (or cumulative duration of keeping the device tilted) defines the speed of browsing the photos (on a single device) or passing them on to another device.
5. Determining the order of devices through their spatial relation to the device sharing the photos ("the photographer's device"). This defines the order of sharing of the photos when they are passed around in a circle.
6. The photos may also be shared by flicking on a photo in the direction of another device. The shared photo changes its orientation when it is displayed on the other device.
7. Pressing display for a time to synchronize the presentation and showing the same photo on all devices.
8. Showing a larger photo on devices joined together (into a "shared view") through pinching/stitching their screens together.
9. Picking up a device to break the joining from a group of stitched devices. Breaking the joining leads to resizing the photo on the devices that remain joined. In the picked up device, an overview is shown. When the picked up device is placed back to the table, the same photo is shown as on the other devices (in "simultaneous" mode) or the next photo in turn for that device (in "sequential" mode). Also other principles may be applied.
10. Separate groups of devices can be joined by pinching/stitching the displays of one display of a device representing each group (e.g., altogether stitching simultaneously two displays).

Figure 5:
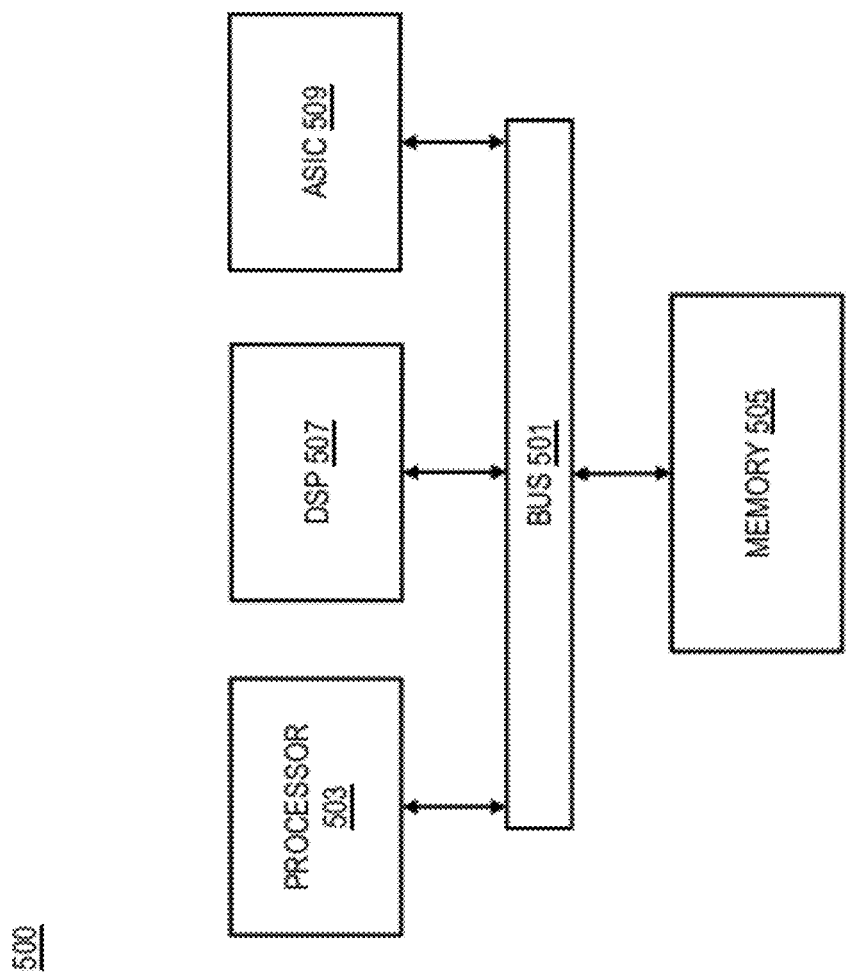
FIG. 5 is a diagram of a chip set that can be used to implement an embodiment of the invention.

FIGS. 3A-3F are flowcharts depicting processes for enabling a group of devices to interact through a common interface for sharing digital media, according to various embodiments. By way of example, the shared media manager 111 of FIG. 1 performs the one or more processes and is implemented in a chip set including a processor and a memory as shown in FIG. 5. In addition or alternatively, all or a portion of the processes may be performed by the shared services platform 103.

In step 301, the shared media manager 111 determines a group of devices for sharing one or more media files. Per step 303, the shared media manager 111 causes joining of one or more displays of devices. As mentioned previously, this corresponds to the process of generating a virtual workspace for defining the proximity, orientation, location and capabilities of devices within the group. It is noted that the joining process may be executed by causing the devices to touch as they are placed along a given surface. In another step 305, the shared media manager 111 then generates a common user interface for presenting the one or more media files on the joined one or more displays. Also, further manipulation of the common user interface—i.e., adapting the mode of interaction—is based, at least in part, on a command, a movement, or a combination thereof associated with one or more of the devices In step 307 of process 306 (FIG. 3B), the shared media manager 111 caused the device to present an overview of the one or more media files available for sharing at the respective display of the at least one device. This step is performed in response to the movement of at one device above a plane defined by other ones of the devices. In certain embodiments, this enables presentation of a corkboard, whiteboard, desktop or other common interface. Also, in step 309, one or more media files are presented to the joined display of multiple connected devices based on a perceived tilting motion.

In step 311 of process 310 (FIG. 3C), the shared media manager 111 operates in connection with a CPS 115 to determine a direction, duration or combination thereof tilting. As mentioned previously, the steepness of tilt determines the rate at which photos are passed along, while the direction of tilt determines the direction in which they are passed to successively ordered/positioned devices. In another step 313, the shared media manager 111 operates in connection with a CPS 115 to determine one or more characteristics of the media files as presented to a respective display, such as based on the determined direction or duration of tilt. Per step 315, one or more characteristics of media files are further determined based on a perceived gesture (command) performed respective to a user device.

In steps 317 and 319 of process 316 (FIG. 3D), position information is determined for the various interacting devices belonging to the virtual workspace, and an order of the joined one or more displays for presenting one or more media files is determined. It is noted that the order of joining is determined based at least in part on the position information of respective devices.

In step 321 of process 320, the shared media manager 111 determines at least one other device providing at least one public (commonly shared) display. Based on the determination, another device within the group that comprises the virtual workspace is caused to join with the other devices, corresponding to step 323. Per step 325, a portion of the one or more media files is caused to be displayed over at least a portion of the public (commonly shared) display.

In steps 327 and 329 of process 326 (FIG. 3F), the shared media manager determines another group of devices and causes designation of at least one device to represent the group in sharing at least one of the one or more media with the other group.

It is further contemplated that a device within a collaborating group may be joined together and/or generate a common user interface to enable the sharing, display or playback of different media file types simultaneously. For example, a first device may operate a services interface 107 for accessing a video player, while a second and third device may operate a music player and photo viewer respectively. Under this scenario, upon generation of a common user interface, the devices may be joined to present the video content, photo content and execute playback of the music content concurrently. The media files representative of varying types may nonetheless be presented concurrently but comprise respective portions of the combined screen. In one embodiment, the same audiovisual media file may be presented simultaneously on several devices. In such scenario, the playback of a stereo audio file may be controlled so that the leftmost device in the group plays the left audio track and the rightmost device in the group plays the right audio track. In surround audio formats, a middle device may play the middle audio track. In yet another embodiment, when one of the connected devices comprises a public display (e.g., a television screen, computer screen), all the audio tracks may be played by the public display device. Under this approach, the devices may pass along media files from their device to the public display and back, such as to enable a further means of collaborative interaction among the group.

In yet another embodiment, the devices may be configured to pass along media files representative of gaming objects. By way of example, a card game, pattern matching game, board game, virtual table hockey game, hot potato game, or other game may be performed through use of the various sensors, service interface 107, augmented reality application 113 as respective devices interact along a determined physical plane (e.g., a table). Per the workspace connection, the players are respective devices may also establish game rules, scoring and execution policies upfront for facilitating shared game play.

In another embodiment, photos may be passed along from one device to multiple other devices simultaneously as opposed to one-at-a-time. By way of example, with respect to FIG. 2F, a user at device 239 may pass photo D to device 233 and 237 simultaneously by executing the flicking motion with two fingers at the same time. This motion may be executed using one hand (e.g., the pointer and middle finger) or two hands (e.g., the pointer fingers of respective hands).

The processes described herein sharing media in a multi-device environment may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 4:
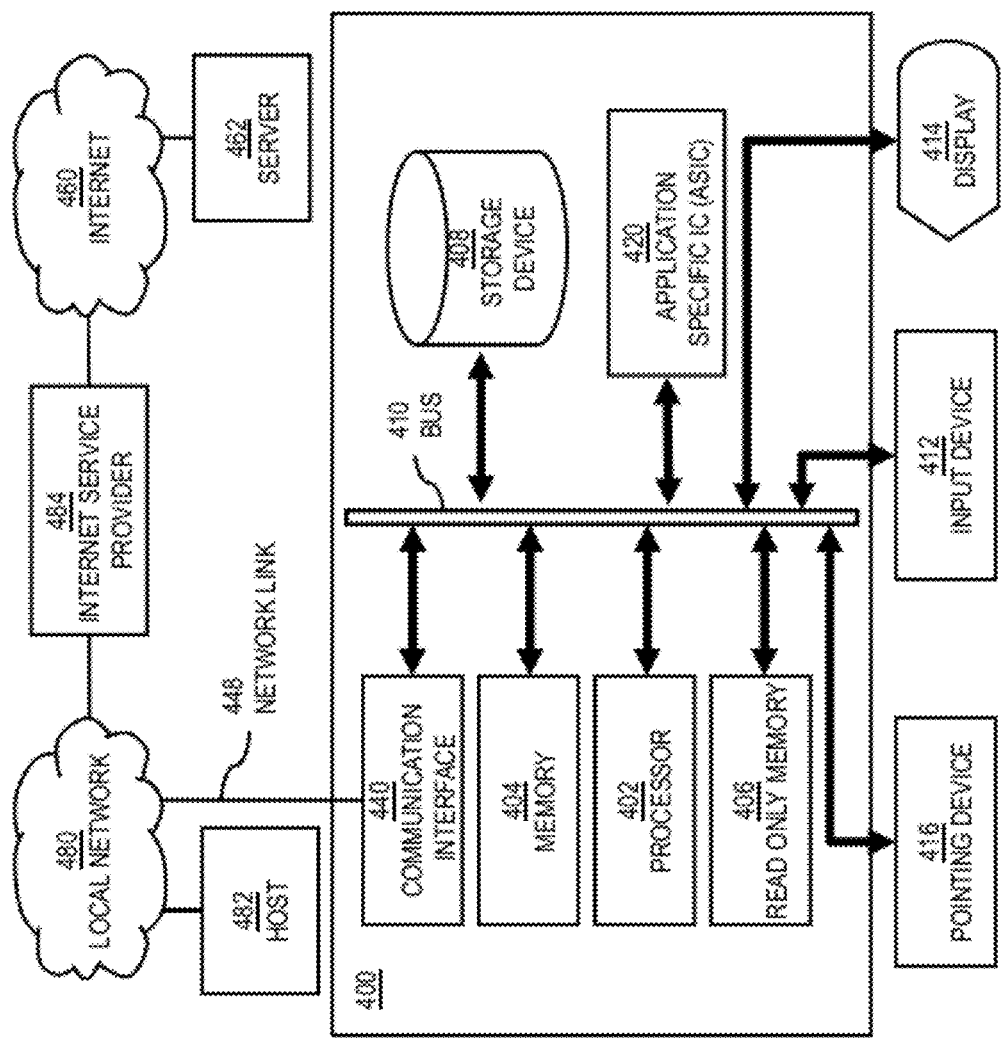
FIG. 4 is a diagram of hardware that can be used to implement an embodiment of the invention.

FIG. 4 illustrates a computer system 400 upon which an embodiment of the invention may be implemented. Although computer system 400 is depicted with respect to a particular device or equipment, it is contemplated that other devices or equipment (e.g., network elements, servers, etc.) within FIG. 4 can deploy the illustrated hardware and components of system 400. Computer system 400 is programmed (e.g., via computer program code or instructions) to share media in a multi-device environment as described herein and includes a communication mechanism such as a bus 410 for passing information between other internal and external components of the computer system 400. Information (also called data) is represented as a physical expression of a measurable phenomenon, typically electric voltages, but including, in other embodiments, such phenomena as magnetic, electromagnetic, pressure, chemical, biological, molecular, atomic, subatomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 400, or a portion thereof, constitutes a means for performing one or more steps of sharing media in a multi-device environment.

A bus 410 includes one or more parallel conductors of information so that information is transferred quickly among devices coupled to the bus 410. One or more processors 402 for processing information are coupled with the bus 410.

A processor (or multiple processors) 402 performs a set of operations on information as specified by computer program code related to sharing media in a multi-device environment. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 410 and placing information on the bus 410. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 402, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 400 also includes a memory 404 coupled to bus 410. The memory 404, such as a random access memory (RAM) or any other dynamic storage device, stores information including processor instructions for sharing media in a multi-device environment. Dynamic memory allows information stored therein to be changed by the computer system 400. RAM allows a unit of information stored at a location called a memory address to be stored and retrieved independently of information at neighboring addresses. The memory 404 is also used by the processor 402 to store temporary values during execution of processor instructions. The computer system 400 also includes a read only memory (ROM) 406 or any other static storage device coupled to the bus 410 for storing static information, including instructions, that is not changed by the computer system 400. Some memory is composed of volatile storage that loses the information stored thereon when power is lost. Also coupled to bus 410 is a non-volatile (persistent) storage device 408, such as a magnetic disk, optical disk or flash card, for storing information, including instructions, that persists even when the computer system 400 is turned off or otherwise loses power.

Information, including instructions for sharing media in a multi-device environment, is provided to the bus 410 for use by the processor from an external input device 412, such as a keyboard containing alphanumeric keys operated by a human user, or a sensor. A sensor detects conditions in its vicinity and transforms those detections into physical expression compatible with the measurable phenomenon used to represent information in computer system 400. Other external devices coupled to bus 410, used primarily for interacting with humans, include a display device 414, such as a cathode ray tube (CRT), a liquid crystal display (LCD), a light emitting diode (LED) display, an organic LED (OLED) display, a plasma screen, or a printer for presenting text or images, and a pointing device 416, such as a mouse, a trackball, cursor direction keys, or a motion sensor, for controlling a position of a small cursor image presented on the display 414 and issuing commands associated with graphical elements presented on the display 414. In some embodiments, for example, in embodiments in which the computer system 400 performs all functions automatically without human input, one or more of external input device 412, display device 414 and pointing device 416 is omitted.

In the illustrated embodiment, special purpose hardware, such as an application specific integrated circuit (ASIC) 420, is coupled to bus 410. The special purpose hardware is configured to perform operations not performed by processor 402 quickly enough for special purposes. Examples of ASICs include graphics accelerator cards for generating images for display 414, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 400 also includes one or more instances of a communications interface 470 coupled to bus 410. Communication interface 470 provides a one-way or two-way communication coupling to a variety of external devices that operate with their own processors, such as printers, scanners and external disks. In general the coupling is with a network link 478 that is connected to a local network 480 to which a variety of external devices with their own processors are connected. For example, communication interface 470 may be a parallel port or a serial port or a universal serial bus (USB) port on a personal computer. In some embodiments, communications interface 470 is an integrated services digital network (ISDN) card or a digital subscriber line (DSL) card or a telephone modem that provides an information communication connection to a corresponding type of telephone line. In some embodiments, a communication interface 470 is a cable modem that converts signals on bus 410 into signals for a communication connection over a coaxial cable or into optical signals for a communication connection over a fiber optic cable. As another example, communications interface 470 may be a local area network (LAN) card to provide a data communication connection to a compatible LAN, such as Ethernet. Wireless links may also be implemented. For wireless links, the communications interface 470 sends or receives or both sends and receives electrical, acoustic or electromagnetic signals, including infrared and optical signals, that carry information streams, such as digital data. For example, in wireless handheld devices, such as mobile telephones like cell phones, the communications interface 470 includes a radio band electromagnetic transmitter and receiver called a radio transceiver. In certain embodiments, the communications interface 470 enables connection to the communication network 105 for sharing media in a multi-device environment to the UE 101.

The term "computer-readable medium" as used herein refers to any medium that participates in providing information to processor 402, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 408. Volatile media include, for example, dynamic memory 404. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 420.

Network link 478 typically provides information communication using transmission media through one or more networks to other devices that use or process the information. For example, network link 478 may provide a connection through local network 480 to a host computer 482 or to equipment 484 operated by an Internet Service Provider (ISP). ISP equipment 484 in turn provides data communication services through the public, world-wide packet-switching communication network of networks now commonly referred to as the Internet 490.

A computer called a server host 492 connected to the Internet hosts a process that provides a service in response to information received over the Internet. For example, server host 492 hosts a process that provides information representing video data for presentation at display 414. It is contemplated that the components of system 400 can be deployed in various configurations within other computer systems, e.g., host 482 and server 492.

At least some embodiments of the invention are related to the use of computer system 400 for implementing some or all of the techniques described herein. According to one embodiment of the invention, those techniques are performed by computer system 400 in response to processor 402 executing one or more sequences of one or more processor instructions contained in memory 404. Such instructions, also called computer instructions, software and program code, may be read into memory 404 from another computer-readable medium such as storage device 408 or network link 478. Execution of the sequences of instructions contained in memory 404 causes processor 402 to perform one or more of the method steps described herein. In alternative embodiments, hardware, such as ASIC 420, may be used in place of or in combination with software to implement the invention. Thus, embodiments of the invention are not limited to any specific combination of hardware and software, unless otherwise explicitly stated herein.

The signals transmitted over network link 478 and other networks through communications interface 470, carry information to and from computer system 400. Computer system 400 can send and receive information, including program code, through the networks 480, 490 among others, through network link 478 and communications interface 470. In an example using the Internet 490, a server host 492 transmits program code for a particular application, requested by a message sent from computer 400, through Internet 490, ISP equipment 484, local network 480 and communications interface 470. The received code may be executed by processor 402 as it is received, or may be stored in memory 404 or in storage device 408 or any other non-volatile storage for later execution, or both. In this manner, computer system 400 may obtain application program code in the form of signals on a carrier wave.

Various forms of computer readable media may be involved in carrying one or more sequence of instructions or data or both to processor 402 for execution. For example, instructions and data may initially be carried on a magnetic disk of a remote computer such as host 482. The remote computer loads the instructions and data into its dynamic memory and sends the instructions and data over a telephone line using a modem. A modem local to the computer system 400 receives the instructions and data on a telephone line and uses an infra-red transmitter to convert the instructions and data to a signal on an infra-red carrier wave serving as the network link 478. An infrared detector serving as communications interface 470 receives the instructions and data carried in the infrared signal and places information representing the instructions and data onto bus 410. Bus 410 carries the information to memory 404 from which processor 402 retrieves and executes the instructions using some of the data sent with the instructions. The instructions and data received in memory 404 may optionally be stored on storage device 408, either before or after execution by the processor 402.

FIG. 5 illustrates a chip set or chip 500 upon which an embodiment of the invention may be implemented. Chip set 500 is programmed to share media in a multi-device environment as described herein and includes, for instance, the processor and memory components described with respect to FIG. 4 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 500 can be implemented in a single chip. It is further contemplated that in certain embodiments the chip set or chip 500 can be implemented as a single "system on a chip." It is further contemplated that in certain embodiments a separate ASIC would not be used, for example, and that all relevant functions as disclosed herein would be performed by a processor or processors. Chip set or chip 500, or a portion thereof, constitutes a means for performing one or more steps of providing user interface navigation information associated with the availability of functions. Chip set or chip 500, or a portion thereof, constitutes a means for performing one or more steps of sharing media in a multi-device environment.

In one embodiment, the chip set or chip 500 includes a communication mechanism such as a bus 501 for passing information among the components of the chip set 500. A processor 503 has connectivity to the bus 501 to execute instructions and process information stored in, for example, a memory 505. The processor 503 may include one or more processing cores with each core configured to perform independently. A multi-core processor enables multiprocessing within a single physical package. Examples of a multi-core processor include two, four, eight, or greater numbers of processing cores. Alternatively or in addition, the processor 503 may include one or more microprocessors configured in tandem via the bus 501 to enable independent execution of instructions, pipelining, and multithreading. The processor 503 may also be accompanied with one or more specialized components to perform certain processing functions and tasks such as one or more digital signal processors (DSP) 507, or one or more application-specific integrated circuits (ASIC) 509. A DSP 507 typically is configured to process real-world signals (e.g., sound) in real time independently of the processor 503. Similarly, an ASIC 509 can be configured to performed specialized functions not easily performed by a more general purpose processor. Other specialized components to aid in performing the inventive functions described herein may include one or more field programmable gate arrays (FPGA) (not shown), one or more controllers (not shown), or one or more other special-purpose computer chips.

In one embodiment, the chip set or chip 500 includes merely one or more processors and some software and/or firmware supporting and/or relating to and/or for the one or more processors.

The processor 503 and accompanying components have connectivity to the memory 505 via the bus 501. The memory 505 includes both dynamic memory (e.g., RAM, magnetic disk, writable optical disk, etc.) and static memory (e.g., ROM, CD-ROM, etc.) for storing executable instructions that when executed perform the inventive steps described herein to share media in a multi-device environment. The memory 505 also stores the data associated with or generated by the execution of the inventive steps.

Figure 6:
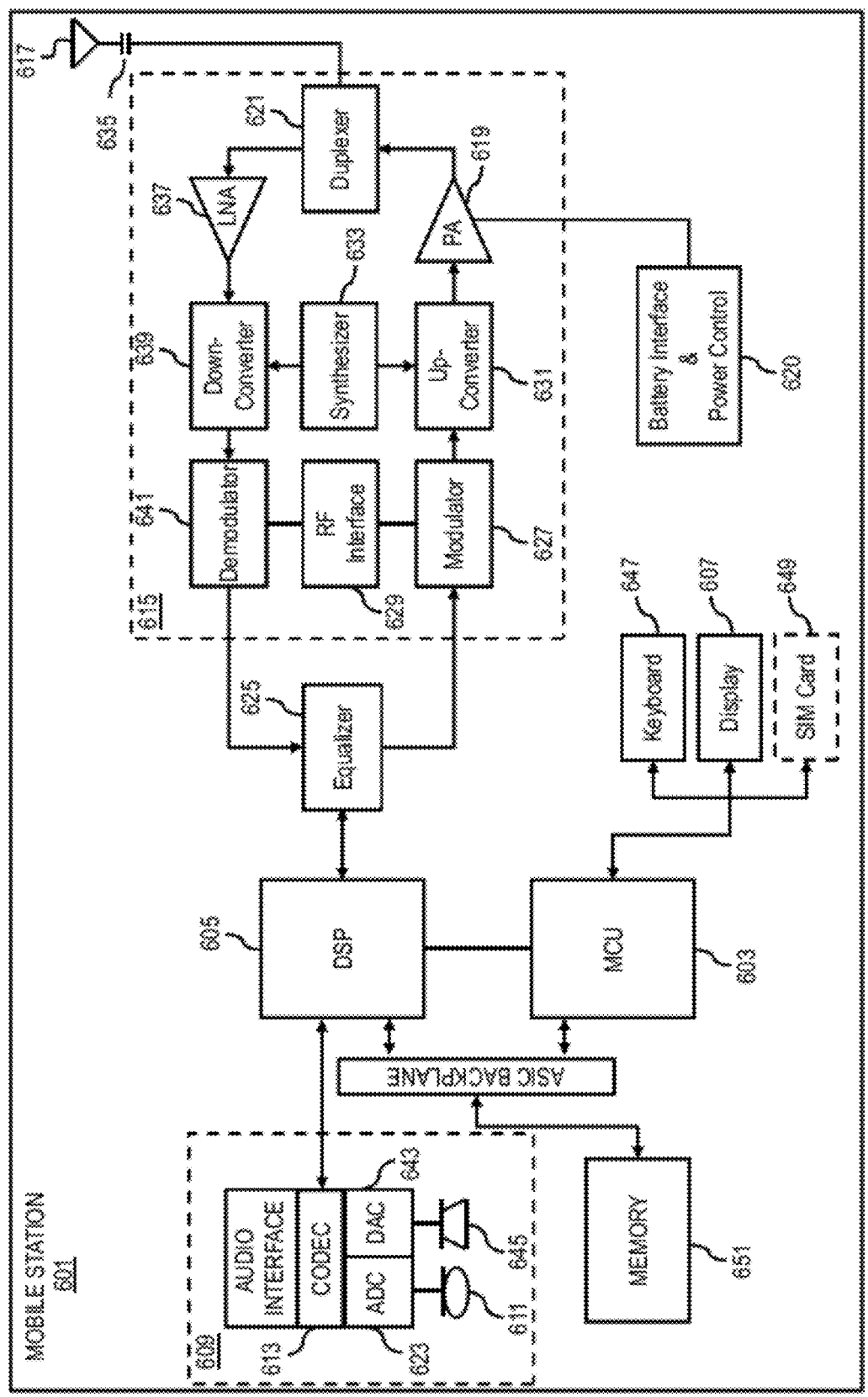
FIG. 6 is a diagram of a mobile terminal (e.g., handset) that can be used to implement an embodiment of the invention.

FIG. 6 is a diagram of exemplary components of a mobile terminal (e.g., handset) for communications, which is capable of operating in the system of FIG. 1, according to one embodiment. In some embodiments, mobile terminal 601, or a portion thereof, constitutes a means for performing one or more steps of sharing media in a multi-device environment. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 603, a Digital Signal Processor (DSP) 605, and a receiver/transmitter unit including a microphone gain control unit and a speaker gain control unit. A main display unit 607 provides a display to the user in support of various applications and mobile terminal functions that perform or support the steps of sharing media in a multi-device environment. The display 607 includes display circuitry configured to display at least a portion of a user interface of the mobile terminal (e.g., mobile telephone).

Additionally, the display 607 and display circuitry are configured to facilitate user control of at least some functions of the mobile terminal. An audio function circuitry 609 includes a microphone 611 and microphone amplifier that amplifies the speech signal output from the microphone 611. The amplified speech signal output from the microphone 611 is fed to a coder/decoder (CODEC) 613.

A radio section 615 amplifies power and converts frequency in order to communicate with a base station, which is included in a mobile communication system, via antenna 617. The power amplifier (PA) 619 and the transmitter/modulation circuitry are operationally responsive to the MCU 603, with an output from the PA 619 coupled to the duplexer 621 or circulator or antenna switch, as known in the art. The PA 619 also couples to a battery interface and power control unit 620.

In use, a user of mobile terminal 601 speaks into the microphone 611 and his or her voice along with any detected background noise is converted into an analog voltage. The analog voltage is then converted into a digital signal through the Analog to Digital Converter (ADC) 623. The control unit 603 routes the digital signal into the DSP 605 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 625 for compensation of any frequency-dependent impairments that occur during transmission though the air such as phase and amplitude distortion. After equalizing the bit stream, the modulator 627 combines the signal with a RF signal generated in the RF interface 629. The modulator 627 generates a sine wave by way of frequency or phase modulation. In order to prepare the signal for transmission, an up-converter 631 combines the sine wave output from the modulator 627 with another sine wave generated by a synthesizer 633 to achieve the desired frequency of transmission. The signal is then sent through a PA 619 to increase the signal to an appropriate power level. In practical systems, the PA 619 acts as a variable gain amplifier whose gain is controlled by the DSP 605 from information received from a network base station. The signal is then filtered within the duplexer 621 and optionally sent to an antenna coupler 635 to match impedances to provide maximum power transfer. Finally, the signal is transmitted via antenna 617 to a local base station. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 601 are received via antenna 617 and immediately amplified by a low noise amplifier (LNA) 637. A down-converter 639 lowers the carrier frequency while the demodulator 641 strips away the RF leaving only a digital bit stream. The signal then goes through the equalizer 625 and is processed by the DSP 605. A Digital to Analog Converter (DAC) 643 converts the signal and the resulting output is transmitted to the user through the speaker 645, all under control of a Main Control Unit (MCU) 603 which can be implemented as a Central Processing Unit (CPU) (not shown).

The MCU 603 receives various signals including input signals from the keyboard 647. The keyboard 647 and/or the MCU 603 in combination with other user input components (e.g., the microphone 611) comprise a user interface circuitry for managing user input. The MCU 603 runs a user interface software to facilitate user control of at least some functions of the mobile terminal 601 share media in a multi-device environment. The MCU 603 also delivers a display command and a switch command to the display 607 and to the speech output switching controller, respectively. Further, the MCU 603 exchanges information with the DSP 605 and can access an optionally incorporated SIM card 649 and a memory 651. In addition, the MCU 603 executes various control functions required of the terminal. The DSP 605 may, depending upon the implementation, perform any of a variety of conventional digital processing functions on the voice signals. Additionally, DSP 605 determines the background noise level of the local environment from the signals detected by microphone 611 and sets the gain of microphone 611 to a level selected to compensate for the natural tendency of the user of the mobile terminal 601.

The CODEC 613 includes the ADC 623 and DAC 643. The memory 651 stores various data including call incoming tone data and is capable of storing other data including music data received via, e.g., the global Internet. The software module could reside in RAM memory, flash memory, registers, or any other form of writable storage medium known in the art. The memory device 651 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 649 carries, for instance, important information, such as the cellular phone number, the carrier supplying service, subscription details, and security information. The SIM card 649 serves primarily to identify the mobile terminal 601 on a radio network. The card 649 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising facilitating a processing of and/or processing (1) data and/or (2) information and/or (3) at least one signal, the (1) data and/or (2) information and/or (3) at least one signal based, at least in part, on the following:
   a device for sharing at least a portion of one or more media files present on the device and on a plurality of other devices;
   a detection of location information associated with the plurality of other devices in proximity of the device;
   a display of the device for presenting, at least in part, the shared at least a portion of the one or more media files based, at least in part, on a transmission of the at least a portion of the one or more media files present on the plurality of other devices to the device; and a manipulation of the device based, at least in part, on a command, a movement, or a combination thereof associated with the device, wherein the manipulation comprises a movement of the device above a plane defined by a surface of the plurality of other devices, wherein the display of the device above the plane generates, at least in part, a view of the shared at least a portion of the one or more media files present on the device and transmitted to the device from the plurality of other devices, and wherein an orientation of the view of the shared at least a portion of the one or media files transmitted from the plurality of other devices to the device is automatically adjusted to accommodate an orientation of the at least a portion of one or more media files present on the device.

2. A method of claim 1, wherein the (1) data and/or (2) information and/or (3) at least one signal are further based, at least in part, on the following:

a presentation of an overview of the at least a portion of the one or more media files available for sharing at the display of the device.

3. A method of claim 1, wherein the movement is a tilting of the device, and wherein the (1) data and/or (2) information and/or (3) at least one signal are further based, at least in part, on the following:

an initiation of the presenting of the at least a portion of the shared one or more media files on the display of the device based, at least in part, on the tilting.

4. A method of claim 3, wherein the (1) data and/or (2) information and/or (3) at least one signal are further based, at least in part, on the following:

a direction, a duration, or a combination thereof of the tilting; and a processing of the direction, the duration, or a combination thereof to determine one or more characteristics of the presenting of the at least a portion of the one or more media files.

5. A method of claim 1, wherein the (1) data and/or (2) information and/or (3) at least one signal are further based, at least in part, on the following:

a processing of the location information to determine an order of the one or more media files present on the plurality of other devices for display on the device.

6. A method of claim 1, wherein the command is a gesture captured by at least one of the device or the one or more other devices, and wherein the (1) data and/or (2) information and/or (3) at least one signal are further based, at least in part, on the following:

a processing of the captured gesture to determine one or more characteristics of the presenting of the at least a portion of the one or more media files, wherein the one or more characteristics include, at least in part, a direction, a duration, an orientation, or a combination thereof.

7. A method of claim 1, wherein the manipulation results in at least one or a combination of the following:

a synchronization of the presenting of the at least a portion of the shared one or more media files on the display of the device;

a leaving of at least one of the devices from the plurality of other devices; and an editing of the at least a portion of the one or more media files.

8. An apparatus comprising:
at least one processor; and
at least one memory including computer program code for one or more programs, the at least one memory and the computer program code configured to, with the at least one processor, cause the apparatus to perform at least the following:

determine a device for sharing at least a portion one or more media files present on the device and on a plurality of other devices;

detect location information associated with the plurality of other devices in proximity of the device;

determine to generate a display of the device for presenting, at least in part, the at least a portion of the shared one or more media files based, at least in part, on a transmission of the at least a portion of the one or more media files present on the plurality of other devices to the device; and cause, at least in part, manipulation of the device based, at least in part, on a command, a movement, or a combination thereof associated with the device, wherein the manipulation comprises a movement of the device above a plane defined by a surface of the plurality of other devices, wherein the display of the device above the plane generates, at least in part, a view of the at least a portion of the shared one or more media files present on the device and transmitted to the device from the plurality of other devices, and wherein an orientation of the view of the shared at least a portion of the one or media files transmitted from the plurality of other devices to the device is automatically adjusted to accommodate an orientation of the at least a portion of one or more media files present on the device.

9. An apparatus of claim 8, wherein the apparatus is further caused to:

cause, at least in part, a presentation of an overview of the at least a portion of the one or more media files available for sharing at the display of the device.

10. An apparatus of claim 8, wherein the movement is a tilting of the device, and wherein the apparatus is further caused to:

cause, at least in part, initiation of the presenting of the at least a portion of the shared one or more media files on the display of the device based, at least in part, on the tilting.

11. An apparatus of claim 10, wherein the apparatus is further caused to:

determine a direction, a duration, or a combination thereof of the tilting; and process and/or facilitate a processing of the direction, the duration, or a combination thereof to determine one or more characteristics of the presenting of the at least a portion of the one or more media files.

12. An apparatus of claim 8, wherein the apparatus is further caused to:

process and/or facilitate a processing of the location information to determine an order of the one or more media files present on the plurality of other devices for display on the device.

13. An apparatus of claim 8, wherein the command is a gesture captured by at least one of the device or one or more other devices, and wherein the apparatus is further caused to:

process and/or facilitate a processing of the captured gesture to determine one or more characteristics of the presenting of the at least a portion of the one or more media files, wherein the one or more characteristics include, at least in part, a direction, a duration, an orientation, or a combination thereof.

14. An apparatus of claim 8, wherein the manipulation results in at least one or a combination of the following:
- a synchronization of the presenting of the at least a portion of the shared one or more media files on the display of the device;
- a leaving of at least one of the devices from the plurality of other devices; and
- an editing of the at least a portion of the one or more media files.

* * * * *